United States Patent [19]
Ellis

[11] 3,777,327
[45] Dec. 11, 1973

[54] LITTER PICK-UP MACHINE

[75] Inventor: Sloan E. Ellis, San Saba, Tex.

[73] Assignee: San Saba Development Association, San Saba, Tex. ; a part interest

[22] Filed: Mar. 9, 1972

[21] Appl. No.: 233,146

Related U.S. Application Data

[63] Continuation-in-part of Ser. No. 214,702, Jan. 3, 1972.

[52] U.S. Cl............................ 15/84, 56/328, 171/85
[51] Int. Cl................................................. E01h 1/04
[58] Field of Search ................... 15/81, 83, 84, 340, 15/4, 339; 241/101.7; 56/328

[56] References Cited

UNITED STATES PATENTS

| | | | |
|---|---|---|---|
| 2,661,584 | 12/1953 | Ronning....................... | 241/101.7 X |
| 2,679,133 | 5/1954 | Soderholm...................... | 15/84 UX |
| 3,222,706 | 12/1965 | Kaar et al. ............................. | 15/340 |
| 3,293,679 | 12/1966 | Murphy ..................... | 15/84 |
| 3,447,179 | 6/1969 | Copeland........................... | 15/84 X |
| 3,484,889 | 12/1969 | McCandless.......................... | 15/340 |

FOREIGN PATENTS OR APPLICATIONS

| | | | |
|---|---|---|---|
| 1,112,147 | 5/1968 | Great Britain........................ | 15/340 |

Primary Examiner—Edward L. Roberts
Attorney—Harvey B. Jacobson et al.

[57] ABSTRACT

A mobile apparatus for movement over the ground or other surface and designed to pick-up, partially sort and partially treat litter of all types. The apparatus includes windrow structure for initially windrowing litter to be picked up and a following horizontal reversely rotating pick-up drum including generally radial flexible flaps for picking the windrowed litter up from the ground or other surface over which the apparatus is moving. Thereafter the retrieved litter is conveyed upwardly by a conveyor (from which small stones and dirt are allowed to fall) and allowed to drop through a flow stream of air resulting in the lighter particles of litter, including grass and weed clippings, being separated from the larger heavier particles of litter. Structure is provided for collecting the separated lighter particles of litter and delivering them to a hammer mill and conveying structure is provided for receiving and upwardly conveying the heavier litter material to an elevated storage bin or hopper carried by the apparatus and supported therefrom for movement between a heavier litter receiving position and a dumping position disposed so as to dump the collected heavier litter to one side of the apparatus into a suitable receptacle such as a vehicle supported hopper moving alongside the litter pick-up apparatus.

11 Claims, 5 Drawing Figures

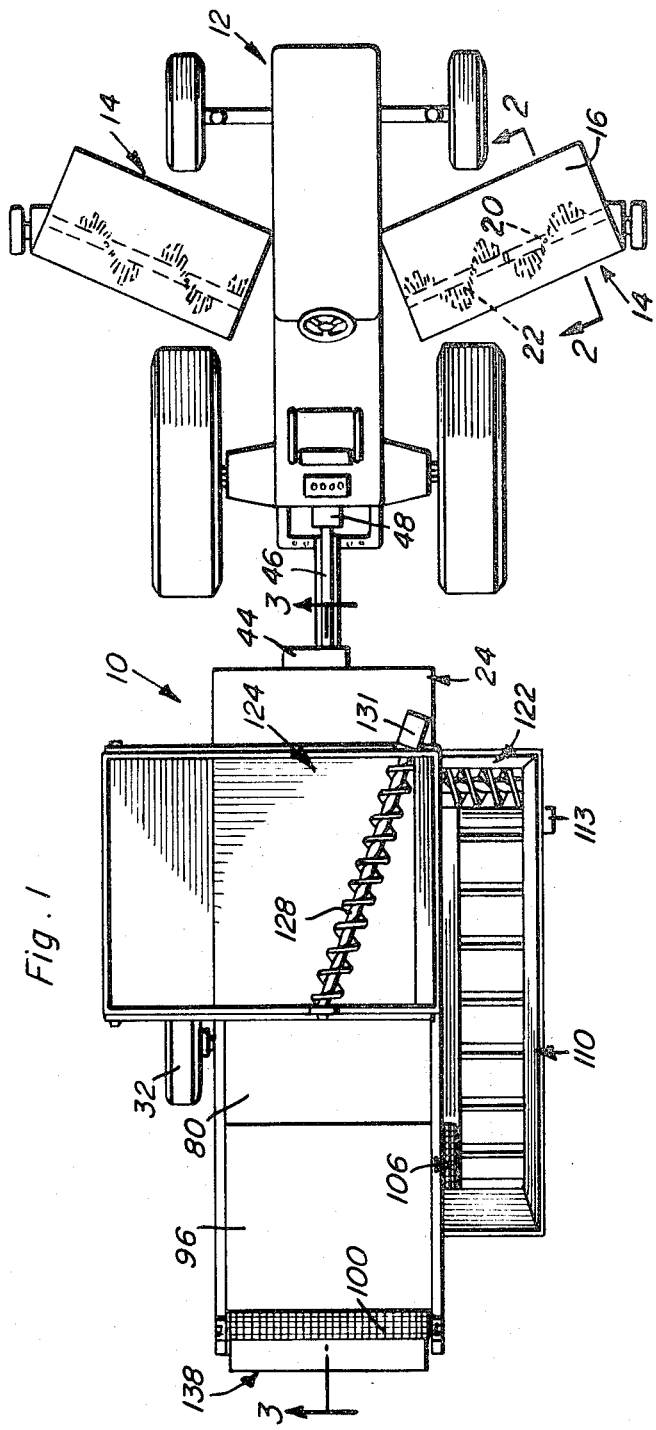

LITTER PICK-UP MACHINE

There are many instances wherein it is desired to pick up various types of litter from large mowed ground surface areas.

Although some similar machines have been heretofore developed, most of these have been specifically designed for street cleaning purposes and are not capable of efficiently picking up substantially all types of ground litter that may be encountered. Accordingly, the litter pick-up machine of the instant invention has structural and operational features incorporated therein specifically designed to handle all types of litter and to pick up litter with a single pass of the machine.

In addition, some previous similar machines are not capable of separating small stones as well as lighter bulky litter components from the total litter retrieved. The lighter bulky components include grass and weed clippings and tend to cause clogging while being conveyed to a collection point for subsequent intermittent dumping from the machine. However, the litter pickup machine of the instant invention, by including structural and operational features capable of separating the lighter particles of litter and acting upon these lighter particles with a hammer mill overcomes the heretofore encountered problem of lighter bulk litter causing clogging. Of course, the hammer mill sufficiently shreds and breaks up the separated lighter bulk litter and lighter litter particles to the extent that they may be returned to the ground without objection and the elimination of the separated lighter particles from the remainder of the litter picked up by the machine affords for more efficient handling of the heavier litter particles.

The main object of this invention is to provide a litter pick-up machine which will be capable of (1) moving at a reasonable speed over the ground or other similar surface, (2) windrowing and picking up litter from the ground in an efficient manner and (3) separating the lighter particles and lighter bulk material of the litter from the remaining portion thereof.

Another object of this invention is to provide a litter pick-up machine that will be capable of picking up substantially all litter acted upon by the machine.

A further object of this invention, in accordance with the immediately preceding object, is to provide a litter pick-up machine including means for shredding and breaking up the separated lighter particles and lighter bulk material of the litter for return to the ground in a non-objectionable manner.

Another important object of this invention is to provide a litter pick-up machine including structure for conveying the heavier particles of litter picked up by the machine to an elevated storage bin supported from the machine in a manner whereby it may be shifted from a heavier litter-receiving position to a side dumping position whereby the heavier litter particles collected therein may be dumped into a suitable mobile litter receiver placed alongside the litter pick-up machine.

Yet another object of this invention is to provide a litter pick-up machine constructed in a manner whereby the portions thereof acting upon the litter upon the ground may be vertically adjusted relative to the ground over which the litter pick-up machine is moving.

A final object of this invention to be specifically enumerated herein is to provide a litter pick-up machine which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a top plan view of the overall litter pick-up machine of the instant invention;

FIG. 2 is an enlarged fragmentary vertical sectional view taken substantially upon the plane indicated by the section line 2—2 of FIG. 1;

Figure 3:
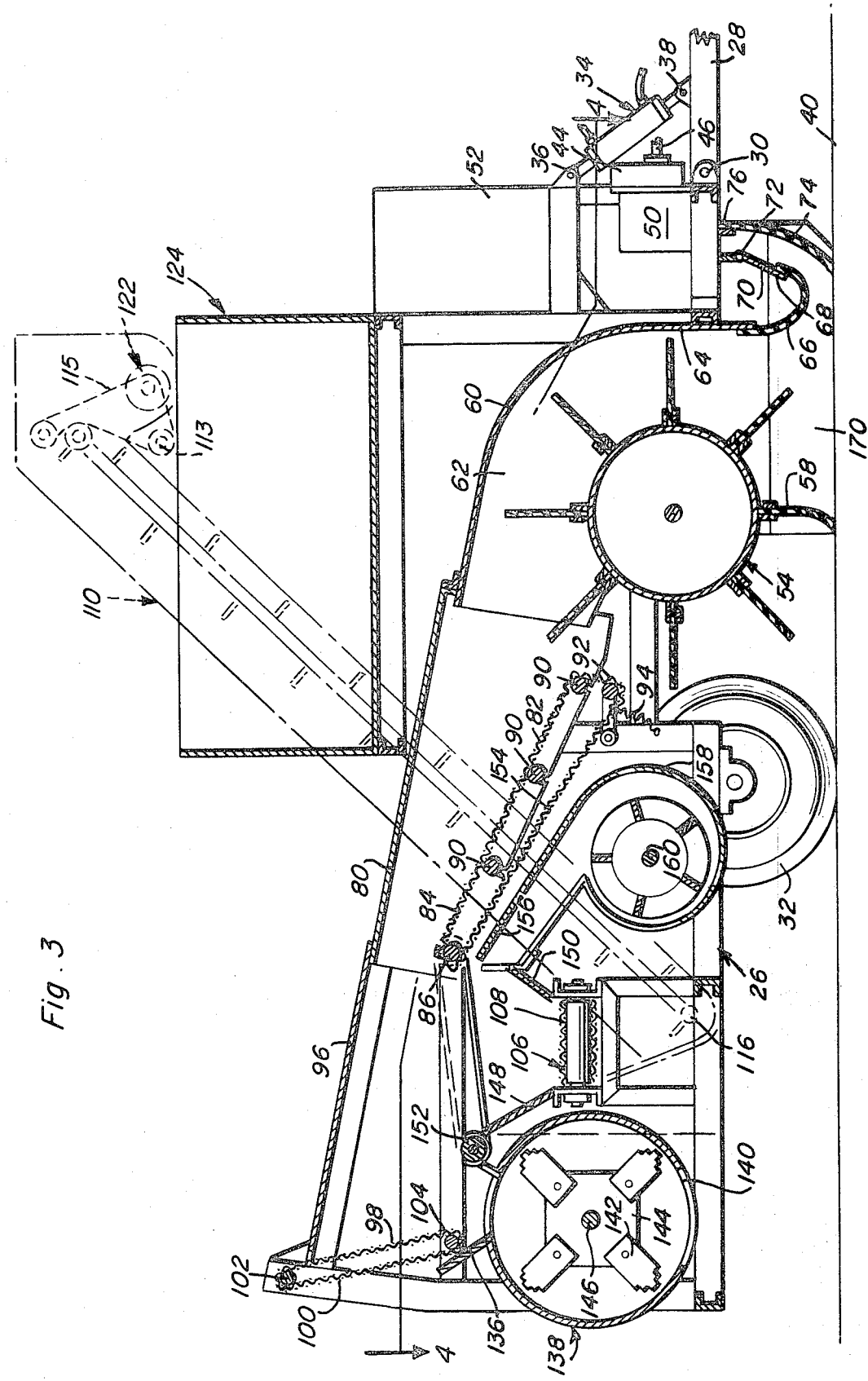
FIG. 3 is a fragmentary enlarged longitudinal vertical sectional view taken substantially upon the plane indicated by the section line 3—3 of FIG. 1.
Figure 4:
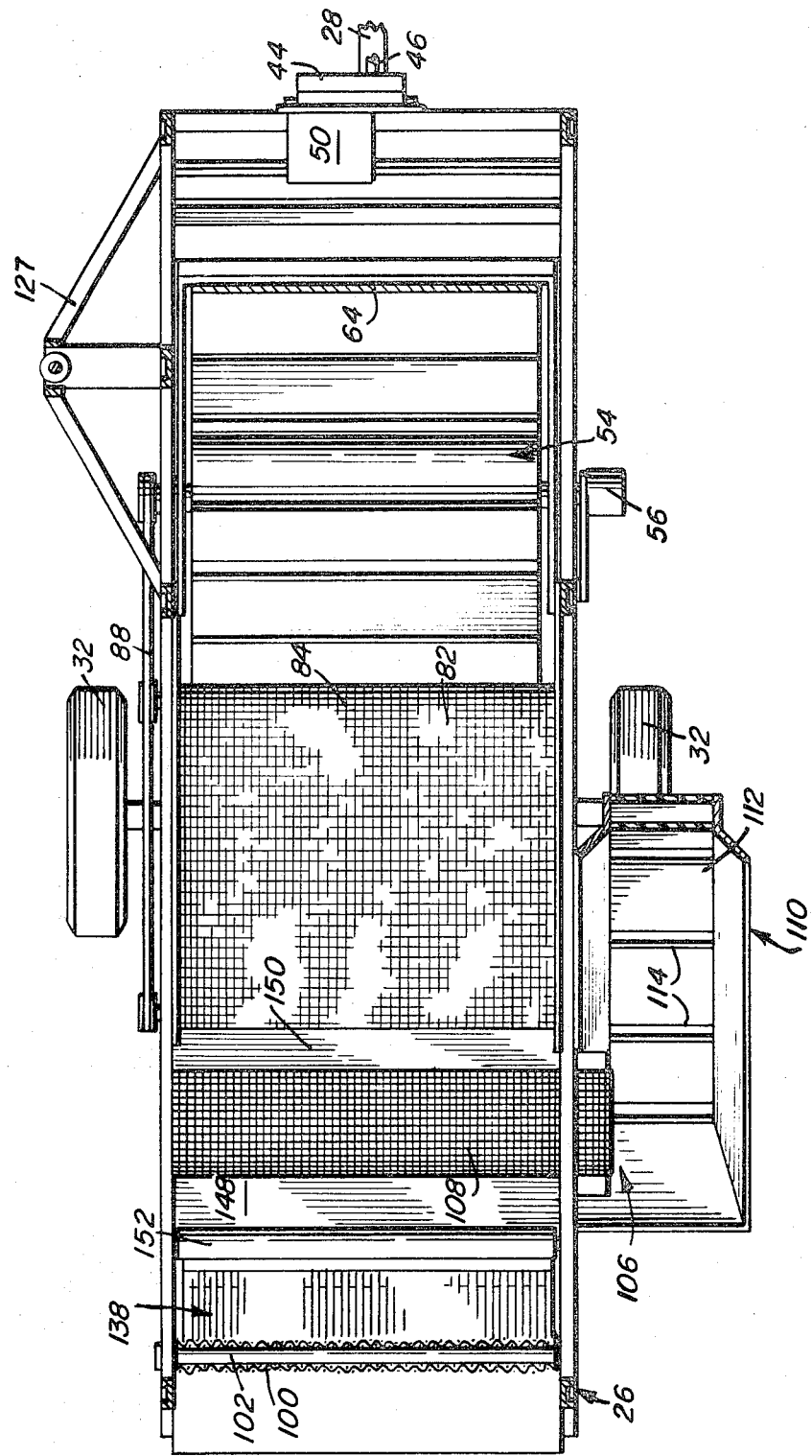
FIG. 4 is a horizontal sectional view taken substantially upon the plane indicated by the section line 4—4 of FIG. 3.

Referring now more specifically to the drawings, the numeral 10 generally designates the litter pick-up machine of the instant invention. The machine 10 includes a forward tractor portion 12 of conventional design but provided with a pair of opposite side windrow assemblies referred to in general by the reference numerals 14. The windrow assemblies include overlying downwardly opening hoods 16 as may best be seen from FIG. 2 of the drawings and the forward lower marginal edge portions of the hoods 16 include depending flexible flaps 18. Also, each windrow assembly 14 includes a rotor shaft 20 having a plurality of radially outwardly projecting and resilient windrow fingers 22 secured thereto in spiral patterns. The fingers 22 are flexible and each assembly 14 includes a hydraulic driving motor (not shown) powered from the central hydraulic system of the tractor 12 and drivingly coupled to the corresponding shaft 20 so as to rotate the latter in a direction whereby the fingers 22 carried by the lower peripheral portions of the shaft 20 are swung forwardly. In this manner, material disposed upon the ground and acted upon by the windrow assemblies 14 is windrowed into a row centered relative to the tractor 12. The windrow assemblies 14 are also hingedly supported from the tractor 12 so that the outer ends of the windrow assemblies 14 may be swung upwardly during transit of the tractor from one location to another. The structure for totally supporting the windrow assemblies 14 and for swinging the windrow assemblies 14 between the raised inoperative positions and the lowered operative positions illustrated in FIG. 2 of the drawings may be of any conventional type (not shown).

The machine 10 further includes a trailer referred to in general by the reference numeral 24. The trailer 24 is towed behind the tractor 12. The trailer 24 includes a main frame 26 provided with a forwardly projecting tongue 28 which is hingedly supported from the main frame 26 as at 30 for oscillation of the tongue 28 relative to the main frame 26 about a horizontal transverse axis at the rear end of the tongue 28. The main frame 26 includes a pair of opposite side ground-engaging support wheels 32 for supporting the rear of the main frame 26 and a hydraulic motor or cylinder referred to in general by the reference numeral 34 is operatively connected between the main frame 26 as at 36 and the tongue 28 as at 38 whereby the elevation of the forward end of the main frame 26 relative to the ground 40 upon which the wheels 32 are disposed may be varied.

If it is desired, the forward end of the main frame 26 may be extended in order to support the windrow assemblies 14, a prime mover and a front axle with steerable dirigible wheels, whereby the machine 10 will be constructed as a single self-propelled unit.

The forward end of the main frame 26 has a gear box 44 mounted thereon driven by a drive shaft 46 extending rearwardly from the power take-off 48 of the tractor 12. The gear box 44 drives a hydraulic pump 50 also carried by the main frame 26 and a hydraulic fluid reservoir 52 is supported from an upper forward portion of the main frame 26.

A main pick-up drum referred to in general by the reference numeral 54 is journaled from the main frame for rotation about a horizontal transverse axis and is driven by means of a hydraulic motor 56 on the right side of the trailer 24. The drum includes circumferentially spaced resilient and flexible flaps 58 extending longitudinally thereof and projecting radially outwardly from the drum 54. The forward upper quadrant of the drum 54 is enclosed in a generally quarter cylindrical rearwardly and downwardly opening transversely extending shield 60 including upstanding opposite side panels 62. The forwardly and downwardly curving portion 64 of the shield 60 projects somewhat below the horizontal plane containing the center axis of the drum 54 and a stiff but flexible and resilient loop panel 66 has its upper rear edge portion supported from the lower end of the portion 64. The panel 66 extends downwardly from the portion 64, curves forwardly and then upwardly and is secured to the lower marginal edge portion 68 of a rigid transverse panel 70 whose upper marginal edge portion is hingedly supported from the forward portion of the main frame 26 as at 72. Also, a forward depending resilient flap 74 which projects downwardly to and contacts the ground 40 has its upper marginal edge portion supported from the main frame 26 as at 76 just forward of the panel 70.

The rear end portion of the shield 60 includes a rearward extension 80 and the upper reach 82 of a conveyor chain-type belt 84 forms a lower wall for the extension 80 through which smaller stones and dirt may fall. The belt 84 is entrained about a rear upper drive roller 86 driven through an endless belt 88 from the left-hand end of the drum 54 opposite to the end thereof adjacent the motor 56. The belt 84 is also trained over idle rollers 90 and about a swingable tension roller 92 acted upon by an expansion spring 94.

The rear end of the extension 80 includes a second extension 96 whose rear end has the forward downwardly moving upstanding reach 98 of a second conveyor chain-type belt 100 disposed thereacross. The belt 100 is trained about an upper driven roller 102 and a lower roller 104.

A transverse conveyor assembly referred to in general by the reference numeral 106 is supported from the main frame 26 immediately rearwardly of and below the roller 86. The conveyor assembly includes a conveyor chain-type belt 108 similar to the belts 84 and 100 and the upper reach of the belt 108 moves material deposited thereon from the left side of the trailer 24 toward the right side of the trailer 24 from which there is supported a forwardly and upwardly inclined conveyor assembly 110. The lower rear end of the conveyor assembly 110 is positioned to receive material discharged from the right end of the conveyor assembly 106 and the conveyor assembly 110 includes an endless conveyor belt 112 including paddles 114. The belt 112 is driven from a hydraulic motor 113 of the conveyor assembly 110 through a chain 115 and the upper reach of the belt 112 moves in a forward and upward direction. Further, the roller 102 of the belt 100 is driven by a hydraulic motor 120.

Figure 5:
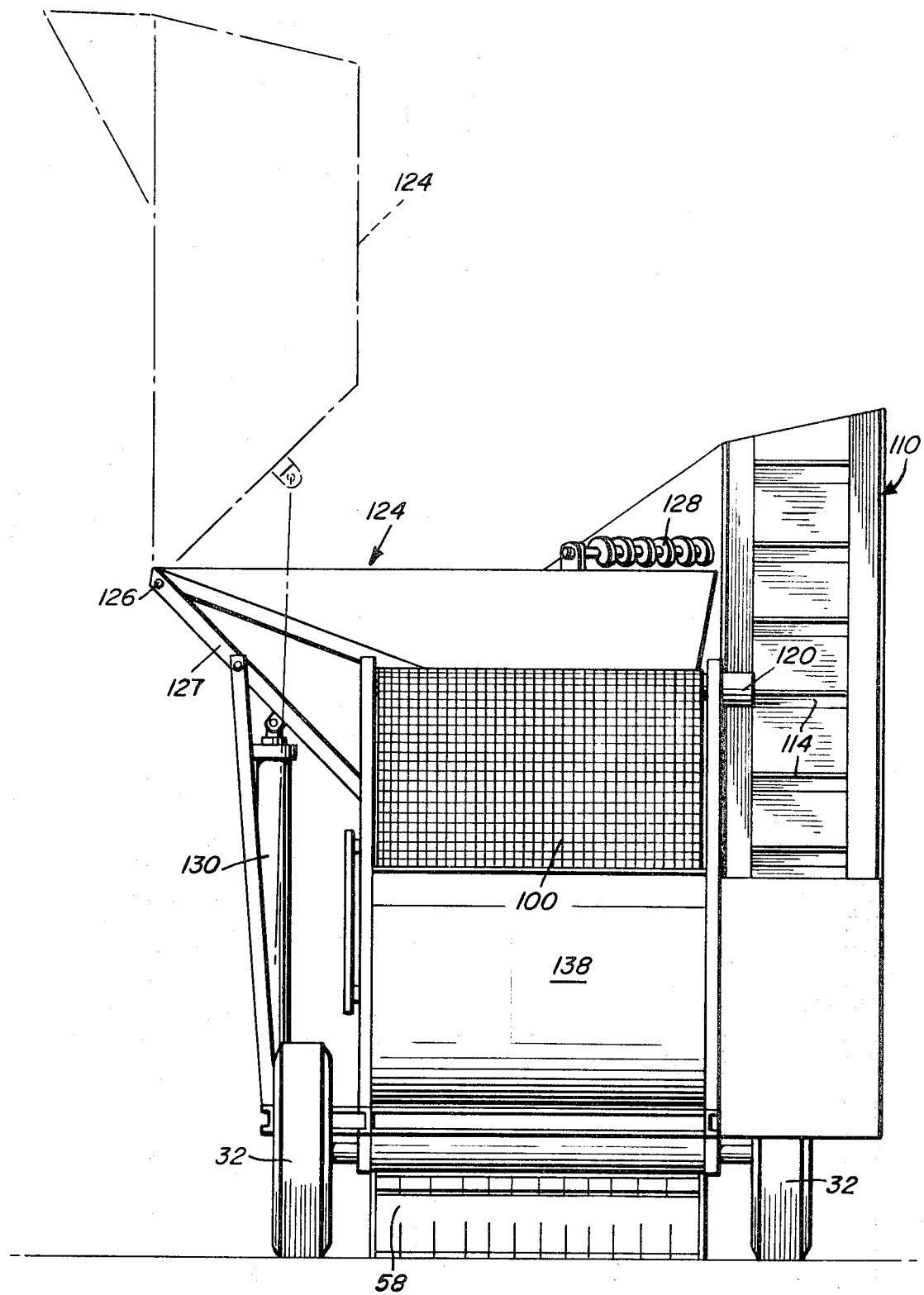
FIG. 5 is a rear elevational view of the litter pickup machine with the side dumping position of the litter-receiving hopper of the machine illustrated in phantom lines.

The upper end of the conveyor assembly 110 includes a short laterally extending auger conveyor assembly referred to in general by the reference numeral 122 and also driven from the motor 113 by the chain 115. The auger conveyor 122 is positioned to receive material conveyed forwardly and upwardly by the conveyor assembly 110 and to discharge the material handled by the auger conveyor 122 from the left end thereof into an upwardly opening hopper assembly referred to in general by the reference numeral 124. The left side of the hopper assembly 124 is pivotally supported as at 126 from a laterally outwardly projecting support assembly 127 carried by the upper portion of the left-hand side of the trailer 24. A large hydraulic cylinder 130 is connected between the hopper assembly 124 and the main frame 26 and is operative, when extended, to swing the hopper assembly from the lowered operative position illustrated in solid lines in FIG. 5 of the drawings positioned to receive material from the auger conveyor 122 to the dumping position illustrated in phantom lines in FIG. 5 of the drawings whereby material within the hopper assembly 124 may be dumped therefrom into an upwardly opening receptacle or bin disposed alongside the trailer 24, such bin being preferably supported from a mobile frame placed alongside the machine 10.

A load distributing auger screw 128 is journaled from the hopper assembly 124 and driven by means of a hydraulic motor 131 and is utilized to distribute a load of trash piling up in the hopper assembly 124 in the forward right-hand corner thereof into which the auger conveyor 122 discharges the material conveyed thereby.

The hydraulic motor 131 and all of the other hydraulic motors hereinbefore referred to and supported from the trailer 24 are driven from the pump 50 through a suitable control station (not shown) on the tractor 12.

Disposed immediately below the lower end of the belt 100 is the upwardly opening entrance throat 136 of a hammer mill assembly referred to in general by the reference numeral 138, the assembly 138 including a downwardly opening outlet 140 and having a plurality of swingable knives 142 pivotally supported from the four corners of each of a plurality of plates 144 mounted on and spaced longitudinally along the center driven shaft 146 of the hammer mill 138. Of course, the shaft 146 is also driven by a hydraulic motor (not shown).

The conveyor assembly 106 is disposed immediately forward of the hammer mill assembly 38 and includes opposite side upwardly divergent panels 148 and 150 for directing material falling from the discharge end of the belt 84 down onto the conveyor assembly 106. In addition, a rubber-coated roller 152 belt driven from the roller 86 is positioned between the upper marginal edge portion of the panel 148 and the upper marginal edge portion of the adjacent side of the entrance throat 136 of the hammer mill 138. The roller 152 is driven in a counterclockwise direction as viewed in FIG. 3 of the drawings and therefore any material falling upon the roller 152 will be carried over the roller 152 and discharged into the entrance throat 136 of the hammer mill 138.

Disposed between the upper marginal edge portion of the panel 150 disposed at the forward side of the conveyor assembly 106 and the lower reach 154 of the belt 84 is the outlet duct 156 of a centrifugal blower assembly 158. The blower 158 includes a hydraulic motor-driven impeller 160 for pumping air outwardly through the outlet 156 and the air discharged from the outlet 156 moves upwardly and rearwardly so as to blow any light particles of trash being discharged from the upper end of the belt 84 over the conveyor assembly 106 and into engagement with the forward upstanding reach 98 of the belt 100 for conveying downwardly into the entrance throat 136 of the hammer mill 138.

In operation, and when the windrow assemblies 14 are swung downwardly to the operative positions thereof illustrated in FIG. 1 of the drawings, the tractor 12 is advanced along the ground 40 so that the windrow assemblies 14 may windrow substantially all of the trash upon the ground 40 into a single row generally centered relative to the tractor 12. Then, as the windrowed trash is acted upon by the drum 54, the trash is picked up by the flaps 58 and moved rearwardly and upwardly through the shield 60 for depositing upon the upper reach 82 of the belt 84 whereby the picked up trash is then discharged from the rear end of the belt 84. The light particles of trash are blown over the conveyor assembly 106 onto the reach 98 of the belt 100 and the heavier particles of trash drop downward into the conveyor assembly 106 for conveying and discharging into the lower end of the conveyor assembly 110.

The lighter particles of trash contacting the reach 98 of the belt 100 are conveyed downwardly into the entrance throat 136 for falling into the hammer mill 138 whereby the lighter particles will be broken up into extremely fine particles and deposited back upon the ground through the outlet opening 140. However, the heavier particles of trash deposited upon the conveyor assembly 106 are conveyed to the right and onto the lower end of the conveyor assembly 110. The conveyor assembly 110 then conveys the heavier particles of trash forwardly and upwardly and deposits them into the auger conveyor 122 which in turn conveys the heavier particles of trash to the left and into the hopper assembly 124 when the latter is in its lowered operative position illustrated in solid lines in FIG. 5 of the drawings. As the heavier particles of trash deposited into the hopper assembly 124 build up in the forward right-hand corner of the hopper assembly 124, the auger screw 128 functions to distribute the build-up of trash in the hopper assembly 124 rearwardly and to the left.

The hydraulic motor or cylinder 134 may be actuated to raise and lower the flaps 58 of the drum 54 relative to the ground. In addition, it will be noted from FIG. 3 of the drawings that the main frame 26 includes opposite side flaps 170 which enclose the forward half of the drum 54 projecting below the side panel 62 of the shield 60. Thus, substantially all trash acted upon by the flaps 58 is prevented from flying either forwardly or outwardly from the sides of the main frame 26.

By separating the finer lighter particles of trash from the heavier particles of trash, the heavier particles may be more conveniently handled and there will be assurance that substantially all of the lighter particles of trash are broken up into such small particles that they may be unobjectionably deposited back upon the ground 40.

Conveyor chain-type belts are utilized as at 84 and 100 for obvious reasons. Any reasonably small stones picked up by the drum 84 and conveyed rearwardly through the extension 80 may fall downwardly through the conveyor chain-type belt 84 and back onto the ground 40 without being acted upon either by the conveyor assembly 106 or the hammer mill 138. In addition, the reach 98 of the belt 100 will be sufficient to stop all but the smaller lighter particles acted upon by the air being discharged from the outlet 156. The extremely small particles of light trash blown rearwardly by the outlet of the blower assembly 158 are not objectionable and may pass through the belt 100 and fall upon the ground.

The construction of the drum 54 is such that substantially all types of ground trash disposed on the ground 40 may be picked up by the drum 54 and acted upon by the conveyors 84, 100 and 106 with the discharge of the latter conveyor also being acted upon by the conveyor assembly 110, the auger conveyor 122 and the auger screw 128.

The foregoing is considered as illustrative only of the principles of the invention. Further, since numerous modifications and changes will readily occur to thos skilled in the art, it is not desired to limit the invention to the exact construction and operation shown and described, and accordingly all suitable modifications and equivalents may be resorted to, falling within the scope of the invention.

What is claimed as new is as follows:

1. In combination, a mobile support frame, means operative to pick up litter from the ground over which said support frame is moved, means operative to separate lighter litter particles and lighter bulk materials such as weed and grass clippings from the picked up litter, and means operative to accumulate the remaining picked up litter, said frame including means operative to receive the lighter litter particles and lighter bulk materials such as weed and grass clippings separated from the picked up litter and to finely break up the lighter litter particles.

2. The combination of claim 1 wherein the last-mentioned means includes means for discharging the finely broken up lighter bulk and particles of litter onto the ground over which the support frame is moving at a point disposed to the rear of the first-mentioned means.

3. In combination, a mobile support frame, means operative to pick up litter from the ground over which said support frame is moved, means operative to separate lighter litter particles and lighter bulk materials such as weed and grass clippings from the picked up litter, and means operative to accumulate the remaining picked up litter, said means operative to accumulate the remaining litter including an overhead hopper including means for intermittently dumping the litter accumulated therein to one side of said support frame for reception in an upwardly opening load bin disposed to said one side of said frame.

4. In combination, a mobile support frame, means operative to pick up litter from the ground over which said support frame is moved, means operative to separate lighter litter particles and lighter bulk materials such as weed and grass clippings from the picked up litter, and means operative to accumulate the remaining picked up litter, said means operative to pick up litter from the ground including a ground-engaging and transversely extending and reversely rotating elongated rotary member provided with generally radially outwardly extending resilient litter pick-up members, a generally quarter cylindrical and rearwardly and downwardly opening shield embracing the upper forward quadrant of said rotary member, said shield defining a rearwardly discharging outlet for said litter pick-up means, a rearwardly and upwardly inclined endless conveyor disposed for receiving litter discharged from said outlet, an elongated transverse upwardly opening conveyor spaced beneath the rear end of said rearwardly and upwardly inclined conveyor for receiving litter falling from the upper discharge end of said rearwardly and upwardly inclined conveyor and operative to convey the material falling thereinto to a first side of said frame, said means for separating lighter litter particles and lighter bulk material such as weed and grass clippings including means operative to discharge a flow of separating air in a rearwardly and upwardly inclined direction through the fall zone of material falling from said rearwardly and upwardly inclined conveyor discharge end into said transverse conveyor.

5. The combination of claim 4 wherein said frame includes means operative to receive the lighter particles of litter and lighter bulk material blown from said fall zone.

6. The combination of claim 5 wherein the last-mentioned means comprises an upstanding foraminous endless conveyor belt having front and rear downwardly and upwardly, respectively, moving reaches, and means operative to receive the lighter particles of litter collected upon and discharged from the lower end of the front reach and to finely break up the lighter litter particles and lighter bulk material.

7. The combination of claim 6 wherein the last-mentioned means includes means operative to discharge the finely broken up lighter litter particles and lighter bulk material onto the surface over which said frame is moving.

8. The combination of claim 7 wherein the last-mentioned means includes means for discharging the finely broken up lighter particles of litter and lighter bulk material onto the ground over which the support frame is moving at a point disposed to the rear of the first-mentioned means.

9. The combination of claim 8 wherein said means operative to accumulate the remaining litter further includes a forwardly and upwardly inclined conveyor having a rear lower inlet end and a forward upper discharge end, said inlet end of said forwardly and upwardly inclined conveyor being disposed to receive the discharge from said transverse conveyor, and transfer means operative to receive litter from the upper end of said forwardly and upwardly inclined conveyor and to discharge the litter received thereby into said hopper.

10. The combination of claim 9 wherein said hopper includes means operative to distribute the litter discharged thereinto in order to prevent an excessive build-up of litter therein at the point of discharge of the litter by said transfer means thereinto.

11. The combination of claim 6 wherein the last mentioned means comprises a hammer mill.

* * * * *